United States Patent
Chiu et al.

(10) Patent No.: US 10,801,936 B2
(45) Date of Patent: Oct. 13, 2020

(54) METHOD FOR CALIBRATING LOAD TESTING MACHINE

(71) Applicant: W&M STEEL INDUSTRIAL CO., LTD., Kaohsiung (TW)

(72) Inventors: Wei-Chen Chiu, Kaohsiung (TW);
Shih-Yuan Hung, Kaohsiung (TW);
Po-Ying Hsu, Kaohsiung (TW);
Chia-Lung Weng, Kaohsiung (TW)

(73) Assignee: W&M STEEL INDUSTRIAL CO., LTD., Kaohsiung (TW)

( * ) Notice: Subject to any disclaimer, the term of this patent is extended or adjusted under 35 U.S.C. 154(b) by 205 days.

(21) Appl. No.: 16/109,730

(22) Filed: Aug. 22, 2018

(65) Prior Publication Data

US 2020/0064243 A1 Feb. 27, 2020

(51) Int. Cl.
*G01N 3/08* (2006.01)
*G01N 3/62* (2006.01)

(52) U.S. Cl.
CPC .............. *G01N 3/62* (2013.01); *G01N 3/08* (2013.01)

(58) Field of Classification Search
CPC ....... G01N 3/62; G01N 3/08; G01N 2203/021
See application file for complete search history.

(56) References Cited

U.S. PATENT DOCUMENTS

| | | | |
|---|---|---|---|
| 6,289,744 B1 * | 9/2001 | Larson | G01N 3/00 73/847 |
| 8,157,522 B2 * | 4/2012 | Bolz | F03D 7/042 415/118 |

\* cited by examiner

*Primary Examiner* — Suman K Nath
(74) *Attorney, Agent, or Firm* — Leong C. Lei

(57) ABSTRACT

A method for calibrating a load testing machine includes a computational unit that is operable to carry out, in a fully automatic manner, an operation of calibration of the load testing machine in order to help reduce the cost of the operation of calibration of the load testing machine and to improve creditability thereof. The load testing machine, as well as a master load cell and a load reader thereof, is set in connection with a computational unit so that the computational unit is operable to directly output an instruction for an operation of the load testing machine and the computational unit is operable to directly record the load obtained with the load testing machine in the calibration and a corresponding calibration values from the force sensor of the testing machine. A set calibration parameters can be calculated and obtained for completing the calibration of the load testing machine.

4 Claims, 2 Drawing Sheets

METHOD FOR CALIBRATING LOAD TESTING MACHINE

(a) TECHNICAL FIELD OF THE INVENTION

The present invention relates generally to a method for calibrating a load testing machine, and more particularly to a method for calibrating a load testing machine that carries out a calibration operation of a load testing machine in a fully automatic manner with a computational unit so as to lower down the operation cost of calibrating the load testing machine but with enhanced public creditability for the tests.

(b) DESCRIPTION OF THE PRIOR ART

A load testing machine is used to inspect physical phenomena, particularly strength of a test object. The knowledge of the load strength of the object is valuable for subsequent applications of the object. The actual strength of a steel cable against a stretching force is a vital and essential factor that is closely related to designs. For example bridges (particularly suspension bridges) and hoisting devices. To get aware of the actual load strength of an object, testing must be conducted with a load testing machine. System parameters of the load testing machine in carrying out a load testing may become incorrect with time. To ensure accuracy of the load testing machine, it is compulsory that calibration of the load testing machine must be carried out once every 12-18 months.

Heretofore, to calibrate a load testing machine, a certified calibrator and a certified trusted and righteous agency or third party must travel to the location where the load testing machine is set up and then, a master load cell coupled with a load reader is connected to the load testing machine to be calibrated. The master load cell is calibrated by a highly restricted manner and provide a very precised accuracy. A manual operation is conducted by varying the output power of the load testing machine for creating various load of force. Multiple sampling points are determined according to the maximum load force available from the load testing machine, such as ten (10) sampling points being respectively set at 0%, 10%, 20%, . . . ; and 100% of the machine capacity. Visual inspection is made on the load reader of the master load cell to determine if the output force of the load testing machine reaches each of the sampling points and data from the testbed force sensor (calibration values) are manually filled in a computational unit. The force sensor of the load testing machine send outputs at the time when the load reaches different sampling point. The calibration values acquired are manually filled, together with the associated load forces, in the computational unit. At each sampling point, the output data and the load force displayed on the load reader of the master load cell are recorded and computed to establish calibrated system parameters. The load of each preset point are re-run to verify the load. The system parameters are then used to calculate the estimated load for verifying the load read from the master load cell. If the load does not reach a certain precision, the calibration process repeats and the parameters are re-estimated until it reaches the required precision. Otherwise, the calibration fails.

When the load testing machine is later used to conduct a load testing on an object, the load acting on the testing object is estimated based on the system parameters established previously.

In such a well known calibration procedure, the calibrator and a righteous third party must travel to the site where the load testing machine is located in order to carry out a calibration operation with a certified righteous third party. It is common that the calibration operator is at a location that is far away from the site where the load testing machine is located. Traveling and shipping cost would be a huge expense for the calibration operation. In addition, the load testing machine is manually operated in the calibration procedure to supply various loading force. A reader coupled with a master load cell must be involved. The actual load is obtained by visual inspection of the load reader. Precise manual control ensures the output force correctly reach each of the preset sampling point. This operation heavily relies on the experience and skills of operation and handling outputs of the load testing machine. Apparently, operation flow fluency would be severely affected by such factors. In addition, manually entering the true load values of the sampling points from visual inspection and the calibration values obtained at the same time into a computational unit is readily affected by human errors and this causes an increase the chance of incorrect calibration result.

It is a challenging issue that must be addressed by the industry to provide a solution for carrying out calibration of a load testing machine in an easier and more accurate manner.

SUMMARY OF THE INVENTION

The present invention provides a method for calibrating a load testing machine, which helps overcome the well known disadvantages of potentially high cost and low public creditability of calibrating a load testing machine.

To achieve the above objective, the present invention provides a method for calibrating a load testing machine. The method for calibrating a load testing machine according to the present invention is to first change and re-design a power mechanism of the load testing machine to provide an fully automated operation. The power mechanism of the load testing machine is connected to a computational unit. The computational unit to control the power mechanism of the load testing machine. The master load cell coupled with a load cell reader is connected with the load testing machine for reading the actual load. The reader is also connected to the computational unit by wire or wireless connection. The reader continuous feeds the load experienced by the master load cell to the computational unit. The computational unit controls the power mechanism to exert various force acting on the connected master load cell. The computational unit is loaded therein with the preset sampling points of the required load for carrying out calibration. The load reader communicates with the computer via wire or wireless connection so that the computational unit is ready to read the instant load information from the load reader at the required sample points.

To use the present invention, the computational unit controls the power mechanism of the load testing machine. The force exerted by the load testing machine gradually increases by increasing the output from the power mechanism. The force experienced by the master load cell is gradually increased therewith. The force output of the load testing machine will reach all the preset sampling points one by one automatically. When the force generated by the power mechanism of the load testing machine gets close to or equal to preset sampling points for calibration, the computational unit captures the actual output force of the load testing machine that is obtained from the load reader of the master load cell and also records the output data of force sensor of the load testing machine at the same time. This operation is repeated until the force of the load testing machine for each of the preset sampling points for calibration is obtained and system parameters are calculated to thereby complete the calibration of the load testing machine. The computational unit is then provided with calculated system parameters corresponding to the forces of the calibrated load testing machine. In the subsequent use in calculation of force value, the parameters may serve as a reference for a load test for a testing object to thereby provide a correct result of load testing.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
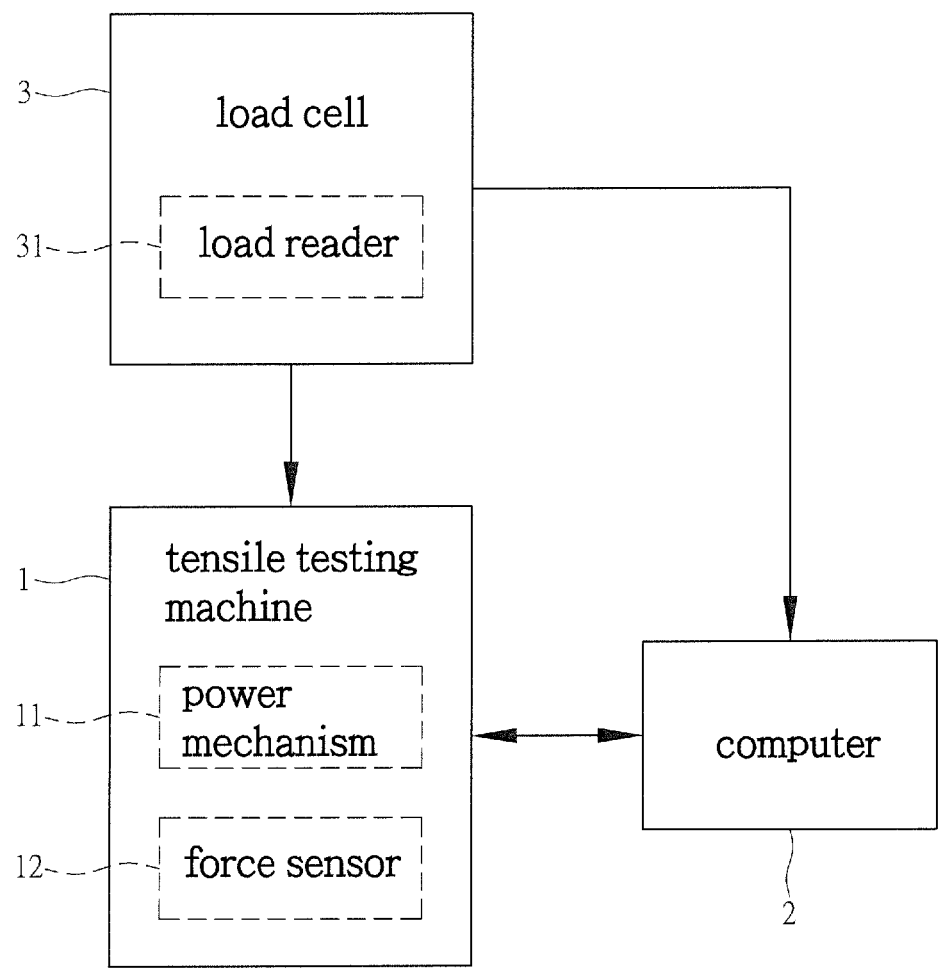
FIG. 1 is a block diagram of the present invention.

Firstly, referring to FIG. 1, the present invention provides a method for calibrating a load testing machine, in which a power mechanism 11 of a load testing machine 1 is first arranged to have an automated operation. The load testing machine 1 is connected to a computational unit 2 and is controlled by an instruction of the computational unit 2 which operates the power mechanism 11 of the load testing machine 1 conducted in a manner of being a fully automated operation to make the computational unit 2 read information of a force sensor 12 of the load testing machine 1. Further, a sampling point for each loading at which calibration is to be made is set up in advance in the computational unit 2. To practice the present invention, sampling can be carried out at ten (10) points that are respectively 0, 10%, 20%, 30%, . . . ; and 100% of a maximum force supplied by the load testing machine 1. The load testing machine 1 is then coupled to a master load cell 3. The master load cell 3 comprises a load reader 31. The load reader 31 is connected to the computational unit 2 so that the computational unit 2 is allowed to access and read information of the load reader 31. Next, the computational unit 2 controls the power mechanism 11 of the load testing machine 1. The power being continuously output from the power mechanism 11, the force that the master load cell 3 experienced is gradually increased such that the force output from the load testing machine 1 reaches the preset sampling points one by one. Later, when the force generated by the power mechanism 11 of the load testing machine 1 gets close to or equal to a force sampling point that is established previously for calibration, the computational unit 2 records the actual output force of the load testing machine 1 that is read in the load reader 31 of the master load cell 3 and also records output data generated by the force sensor of load testing machine 1 at the same time. This operation is repeated until the force supplied from the load testing machine 1 that corresponds to each of the preset sampling points for calibration has been obtained. This completes the calibration operation of the load testing machine 1. The computational unit 2 acquires and records all the force values of the calibrated load testing machine 1 and the calibration values of the force sensor 12 of the load testing machine 1. The force and the output data of each point can then be used to carry out necessary calculation in order to obtain a set of calibrated system parameters and the parameters are used to establish a load estimation formula. When the load testing machine 1 is used in a later time, the formula can be used to calculate the force acting on the test object in a load test so that a correct report of load test can be provided.

Figure 2:
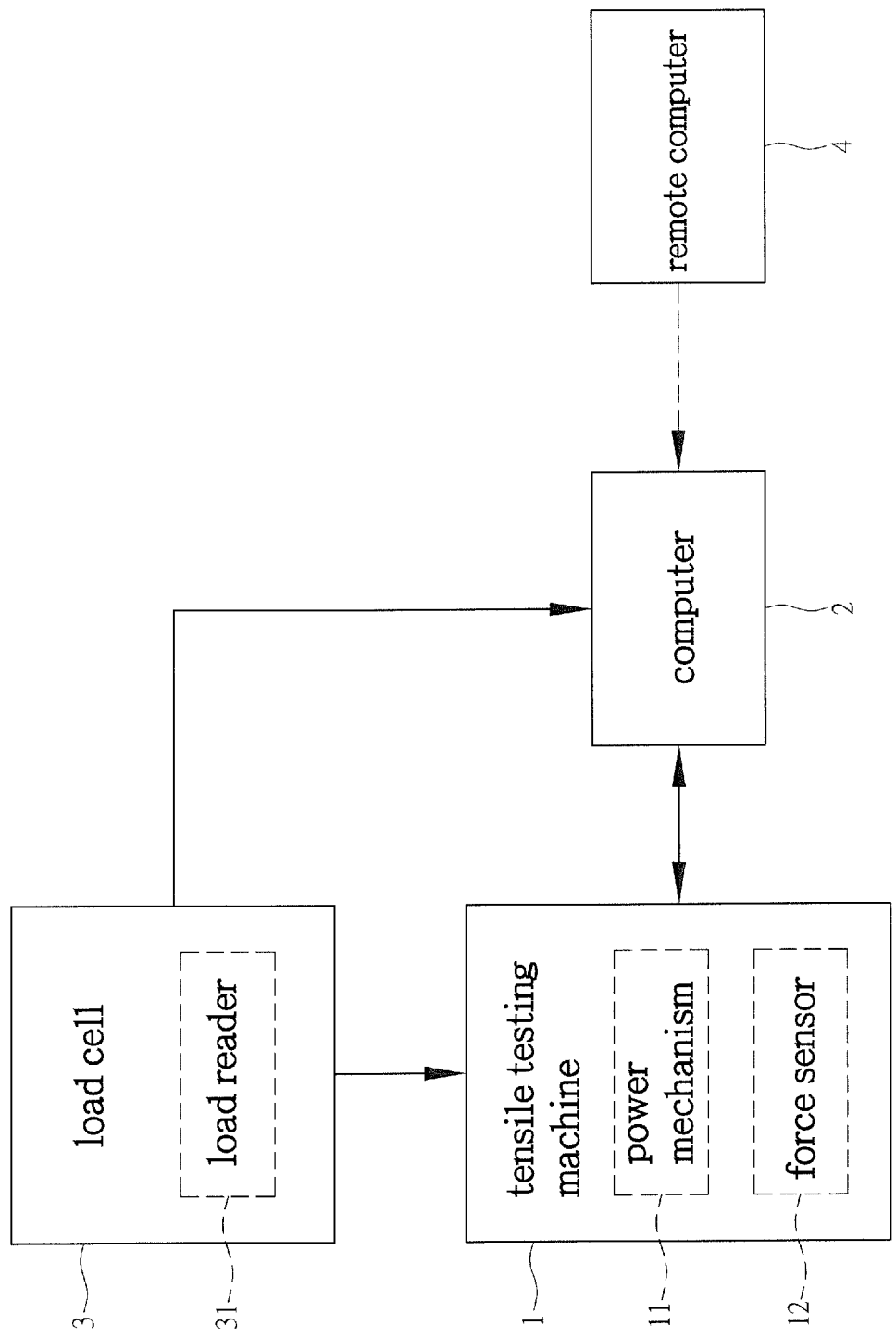
FIG. 2 is a block diagram of another embodiment of the present invention.

In another embodiment of the present invention, as shown in FIG. 2, the computational unit 2 that is set in connection with the load testing machine 1 in this invention can be further connected, through a network, such as the Internet, to a remote computational unit 4, so that the remote computational unit 4 may issue an execution instruction through the network to the computational unit 2 to allow the method for calibrating a load testing machine according to the present invention to be controlled and operated at a remote site. It is more convenient and more efficient to carry out calibration.

Further, to practice the present invention, the connection between the computational unit 2 and the load reader 31 of the load cell 3 can be made in a wired manner or a wireless manner. Further, data concerning the force supplied from the power mechanism 11 of the load testing machine 1 and the actual force corresponding to a preset calibration sampling point are encrypted and then transmitted to the computational unit 2 for recording. As such, the encryption provides additional protection against security issues concerning personnel watching in order to secure the correctness of calibration.

The effectiveness of the present invention is that the present invention makes the load testing machine 1 and the master load cell 3 and the load reader 31 thereof connected with the computational unit 2 so that the computational unit 2 issues an output instruction to the operation of the load testing machine 1 and the computational unit 2 is operable to directly record the output data from the force sensor of the load testing machine 1 during the calibration and the associated actual force in order to carry out, in an automatic manner, the calibration operation of the load testing machine. This method eliminate the need for a high cost that a calibration operator must travel to the site in the known way of manual calibration. Further, the computational unit provides a function of encryption of data to eliminate the potential risk of security breach due to insufficiency and loophole of personal watching so as to ensure correctness of calibration and to improve the creditability of calibration.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A method for calibrating a load testing machine, comprising steps of:
arranging a power mechanism of the load testing machine to operate through a fully automatic process;
setting the load testing machine in connection with a computational unit to be controlled by instructions of the computational unit to make the power mechanism output power and finely adjust the power automatically and to make the computational unit read information of a force sensor of the load testing machine; and
connecting the load testing machine with a master load cell, the master load cell including a load reader, the load reader being set in wired or wireless connection with the computational unit to allow the computational unit to read information of the load reader;
wherein the computational unit includes a set of sampling points to which each of a plurality of preset loads for calibration to be carried out corresponds; the computational unit is able to issue an instruction that makes the power mechanism of the load testing machine automatically increases a force; the force generated by the power mechanism of the load testing machine gets close to or equal to one of the set of sampling points; the computational unit records an actual force output from the load testing machine by reading the load reader of the master load cell and also records the output data generated by the force sensor of the load testing machine at the time which current force reaches a load in one of a plurality of preset sampling points; wherein the force and the output data of each point can then be used to carry out necessary calculation in order to obtain a set of calibrated system parameters which are used to establish a load estimation formula for calculating force acting on a test object in a load test so that a correct report of the load test can be provided.

2. The method for calibrating a load testing machine according to claim 1, wherein the computational unit is connected to the load reader of the load cell in a wired manner.

3. The method for calibrating a load testing machine according to claim 1, wherein the computational unit is connected to the load reader of the master load cell in a wireless manner.

4. The method for calibrating a load testing machine according to claim 1, wherein the computational unit that is connected to the load testing machine is further connected to a remote computational unit through a network such that the remote computational unit is able to issue an instruction to the computational unit that is connected to a new designed load testing machine to allow the calibration operation to be controlled at a remote site.

\* \* \* \* \*